(12) United States Patent
Riley et al.

(10) Patent No.: US 8,390,510 B2
(45) Date of Patent: Mar. 5, 2013

(54) METHODS AND APPARATUSES FOR AFFECTING APPLICATION OF A FILTERING MODEL USING CARRIER PHASE

(75) Inventors: Wyatt Thomas Riley, Chesterbrook, PA (US); Quanwei Liu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 12/560,840

(22) Filed: Sep. 16, 2009

(65) Prior Publication Data
US 2011/0063165 A1 Mar. 17, 2011

(51) Int. Cl.
G01S 19/42 (2010.01)
G01S 19/37 (2010.01)

(52) U.S. Cl. .............................. 342/357.25; 342/357.77
(58) Field of Classification Search ............. 342/357.25, 342/357.75, 357.77; 701/213
See application file for complete search history.

(56) References Cited

U.S. PATENT DOCUMENTS

| | | | |
|---|---|---|---|
| 5,398,034 A | 3/1995 | Spilker, Jr. | |
| 5,451,964 A | 9/1995 | Babu | |
| 6,275,185 B1 * | 8/2001 | Loomis | 342/357.46 |
| 6,313,786 B1 * | 11/2001 | Sheynblat et al. | 342/357.23 |
| 6,516,021 B1 | 2/2003 | Abbott et al. | |
| 6,784,831 B1 * | 8/2004 | Wang et al. | 342/357.63 |
| 7,961,146 B2 * | 6/2011 | Muraguchi | 342/357.77 |
| 2006/0161329 A1 | 7/2006 | Crane et al. | |

OTHER PUBLICATIONS

International Search Report and Written Opinion—PCT/US2010/049183, International Search Authority—European Patent Office—Dec. 22, 2010.
Kwang-Hoon Kim, Gyu-In Jee, Jong-Hwa Song: "Carrier Tracking Loop using the Adaptive Two-StageKalman Filter for High Dynamic Situations", International Journal of Control, Automation, and Systems, vol. 6, No. 6, Dec. 31, 2008, pp. 948-953, XP002613025, the whole document.
Kwang-Hoon Kim, Jong-Hwa Song, Gyu-In Jee, Sung-Hyuck Im: "The Adaptive Vector , Tracking Loop design for High-Dynamic situations", Proceedings of the ENC-GNSS 2009, May 6, 2009, XP002613024, Naples, Italy the whole document.
Mathew Lashley, David M. Bevly: "Vector Delay/Frequency Lock Loop Implementation snd Analysis" Proceedings of the ION 2009 International Technical Meeting, Jan. 28, 2009, pp. 1073-1086, XP002613023, U.S.A. col. 1-col. 18; figures 1,2.
XP002613023, U.S.A. column 1—column 18;figures 1,2.

* cited by examiner

*Primary Examiner* — Cassie Galt
(74) *Attorney, Agent, or Firm* — Jennifer M. Pascua

(57) ABSTRACT

Methods and apparatuses are provided that may be implemented various electronic devices to affect application of a filtering model used for obtaining a navigation solution. In particular, signal characteristics of one or more received signals are used for selecting application of a particular filtering model from a plurality of filtering models.

24 Claims, 3 Drawing Sheets

METHODS AND APPARATUSES FOR AFFECTING APPLICATION OF A FILTERING MODEL USING CARRIER PHASE

BACKGROUND

1. Field

The subject matter disclosed herein relates to processing of signals for obtaining a navigation solution.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and, in particular, positioning systems that exploit information received at a mobile device. Here, such positioning techniques may include, for example, processing signals transmitted from terrestrial or space based transmitters. Regarding techniques involving processing of signals from space based transmitters, satellite positioning systems (SPS) such as the global positioning system (GPS) and other like Global Navigation Satellite Systems (GNSS), may be used. SPS enabled devices, for example, may receive wireless SPS signals that are transmitted by orbiting satellites of a GNSS and/or other terrestrial based transmitting devices. The received SPS signals may, for example, be processed to determine a global time, a range or pseudorange, an approximate or accurate geographical location, altitude, and/or speed of the SPS enabled device. Consequently, various position, time and/or velocity estimation processes may be supported, at least in part, using an SPS enabled device.

It is understood that pseudorange measurements obtained from receipt of SPS signals at a mobile station may have errors resulting from any one of several sources such as, for example, errors in a receiver clock at the mobile station, false correlation peak detections, just to name a few examples. In estimating a position and/or location of a mobile station based upon pseudorange measurements, such pseudorange measurements may be processed using any one of several filtering models such as, for example, a least square error or Kalman filter. Such filtered pseudorange measurements may be used in computing a navigation solution.

SUMMARY

In particular implementations, a system and/or method is adapted to obtain one or more pseudorange measurements based, at least in part, on one or more received satellite positioning system (SPS) signals. A filter model selected from a plurality of filter models may be applied to the obtained pseudorange measurements to obtain a navigation solution. Such a filter model may be selected based, at least in part, on a difference between a measured pseudorange rate and a reference pseudorange rate associated with at least one of said received SPS signals. It should be understood, however, that this is merely an example implementation and that claimed subject matter is not limited in this respect.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
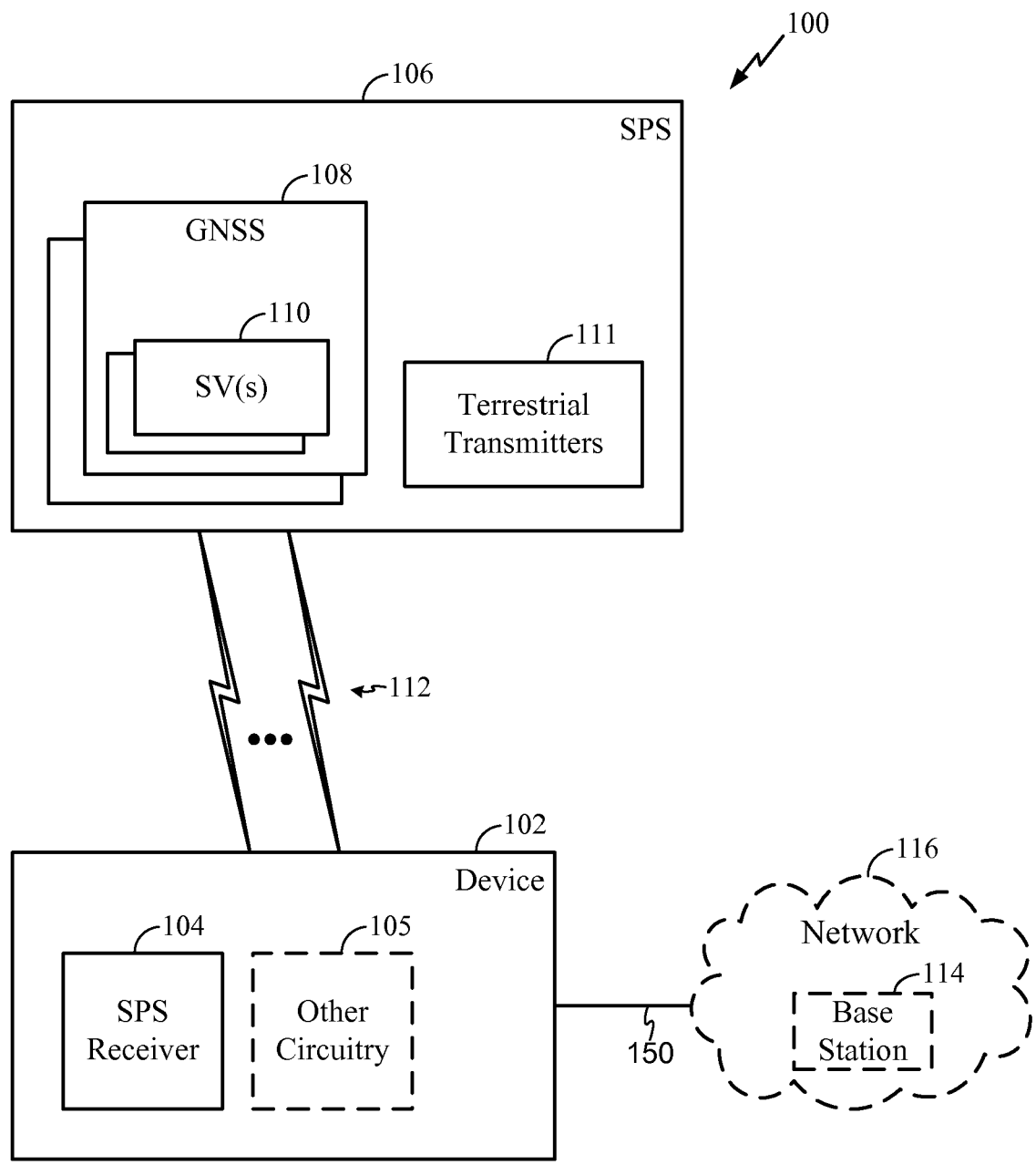
FIG. 1 is a schematic block diagram illustrating an exemplary signaling environment that includes at least one device capable of supporting, at least in part, one or more position/velocity/time estimation processes based, at least in part, on one or more transmitted and received SPS signals, in accordance with an implementation.

Methods and apparatuses are provided that may be implemented in various electronic devices to affect application of specific filtering models to process pseudorange and/or pseudorange rate measurements for use in a position/velocity/time estimation filter based, at least in part, on whether such measurements are taken at a receiver that is in motion or relatively still.

Also as described in greater detail in subsequent sections, as used herein a satellite positioning system (SPS) may include a variety of like or different types of systems, devices, processes, etc., that are capable in providing and/or otherwise supporting in some manner a position/velocity/time estimation process. By way of example but not limitation, in certain example implementations an SPS may include one or more global navigation satellite systems (GNSS), such as the global positioning system (GPS), Galileo and Glonass having a plurality of space vehicles (SVs), and/or one or more terrestrial based networks/devices acting as a "pseudolite", which transmit SPS signals that may be acquired by a receiver such as a receiver that is co-located with a mobile device.

As used herein, a position/velocity/time estimation process may include any process in which a device may be involved, that in some manner is based, at least in part, on SPS related information associated with at least one SPS signal acquired by an SPS receiver in the device and/or an SPS receiver coupled to but external to the device. In certain example implementations, a position/velocity/time estimation process may include a position/navigation capability that is provided by a device based on locally maintained measurement information. In certain other example implementations, a position/velocity/time estimation process may include a position/navigation capability that is provided in part by one or more other devices with assistance from the host device based, at least in part, on SPS related information that is communicated between the host device and the one or more other devices.

As part of a process to obtain estimates of position/velocity/time for a navigation solution, measurements of pseudorange and/or pseudorange rate at a receiver from a transmitter may be obtained from processing signals acquired at the receiver. Such measurements of pseudorange and/or pseudorange rate may be processed according to a filtering model to provide an estimated and/or predicted location (or "position fix"), and/or estimated and/or predicted velocity of the receiver as part of a navigation solution using well known techniques including, for example least square error techniques.

In particular implementations, a particular filtering model, such as a Kalman filter, may apply different processing and/or rules in obtaining an estimated position/velocity/time based, at least in part, on particular conditions. For example, if it is assumed that a receiver is not moving from its position (e.g., relative to the earth), a "static" filtering model may be applied to the processing of pseudorange and/or pseudorange rate measurements. Conversely, if it is assumed that a receiver is in motion from its position (e.g., relative to the earth), a "dynamic" filtering model may be applied instead.

In one particular implementation, a static filtering model may, for example, presume that velocity of the receiver is zero while a dynamic filtering model may presume that there is some non-zero velocity. In another particular implementation, a static filtering model may apply less weight to pseudorange rate measurements than applied with a dynamic filtering model. It should be understood, however, that such static and dynamic filtering models are merely examples of different types of filtering models that may be applied to the processing of pseudorange/pseudorange measurements, and claimed subject matter is not limited in this respect.

In other particular implementations, transitions between application of different filter models may be initiated in response to detection of different types of information such as, for example, signal strength of a received SPS signal. For example, signal strength may be used to determine application of a first filter model adapted or tailored for use in an "indoor" environment versus application of a second model adapted or tailored for use in an "outdoor" environment. Here, if the signal strength of a received signal is deemed relatively weak, for example, it may be deduced that the receiver is probably in an indoor environment and that a corresponding indoor filter model should be applied. In contrast, if the signal strength of a received signal is deemed relatively strong, for example, it may be deduced that the receiver is probably in an outdoor environment and that a corresponding outdoor filter model should be applied. In other particular implementations, transitions to application of a different filter model may be triggered in response to detected changes in signal strength.

In addition or alternatively to transitioning between and/or among the aforementioned "dynamic", "static", "indoor" and "outdoor filter models", transitions between application of an "urban" versus "rural" filter model may be initiated in response to measurements of the same or different signal characteristics.

Also, certain implementations may have multiple variations of a static and/or dynamic filtering model. For example, variations of a dynamic filter may be tailored based upon whether a receiver is assumed to moving in a relatively straight line or turning often. Also, a particular example discussed above is directed to binary transitions between application of a single static filter model and application of a single dynamic filter model. Here, it should be understood that other particular implementations may transition among three or more of such dynamic and static filter models directed to particular degrees of perceived dynamism of a receiving device. For example, particular filter models from such a collection of three or more filter models may be applied based, at least in part, on a particular perceived speed associated with the receiving device. Again, these are merely examples of different filtering models that may be applied in particular implementations and claimed subject matter is not limited in this respect.

In one particular implementation, a transition from application of a static filter to application of a dynamic filter may be initiated by a detection that a receiver has begun moving from a still position. Likewise, a transition from application of a static filter model to application of a dynamic filter model may be initiated by a detection that a receiver in motion has come to rest at a relatively still position. In certain applications, a late or slow transition from application of a dynamic filter model to application of a static filter model, after a moving receiver has come to rest, may result in large position drifts, especially while a receiver is in an urban environment. Similarly, a late or slow transition from application of a static filter model to application of a dynamic filter model, after a receiver at rest has begun to move, may also incur position errors. Also, depending on particular techniques employed, the presence of multipath, which may introduce large position, velocity or uncertainty estimate errors, may lead to erroneous detections of transitions between a receiver being in motion and the receiver being relatively still. Such transitions between and/or among application of different filtering models may occur with use of position, time and/or velocity estimates provided by a filtering model based upon filtered pseudorange measurements, for example.

In a particular implementation, a method, system and/or apparatus may obtain one or more pseudorange and pseudorange rate measurements based, at least in part, on one or more received satellite positioning system (SPS) signals, and then apply a filter model to the pseudorange and pseudorange rate measurements to obtain a navigation solution. A particular filter model applied may be changed between and/or among multiple different available filtering models, such as between a static filter model and a dynamic filter model for example, in response to a difference between a reference pseudorange rate and a measured pseudorange rate of at least one of the received SPS signals.

In a particular implementation, as discussed below, such a measured pseudorange rate may be computed directly from a measured change in a carrier phase of a received SPS signal. It should be understood, however, that this particular computation of a measured pseudorange rate may be determined independently of a pseudorange rate measurement determined from Doppler frequency measurements. Further, in another particular implementation, a pseudorange rate measurement computed from a detected change in carrier phase of a received SPS signal may be obtained, for example, directly from the received SPS signal independently of an estimated position, time and/or velocity provided by a filter model applied to pseudorange and pseudorange rate measurements. It should be understood, however, that these are merely examples of how a measured pseudorange rate may be determined and claimed subject matter is not limited in this respect.

A reference pseudorange rate may comprise, for example, an expected or predicted pseudorange rate under certain assumptions. One such assumption might be that a receiving device is static with respect to a reference frame (e.g., earth-centered coordinates). For example, it may be assumed that a transmitter is moving relative to such a reference frame (e.g., an orbiting SV moving relative to the earth). Accordingly, if a receiving device is actually moving relative to the reference frame (i.e., not static as previously assumed), a measured pseudorange rate from the receiving device to the transmitter may be significantly different from the reference pseudorange rate.

In another example, in addition to assuming that a receiving device is static, it may be further assumed that a transmitter is static relative to such a reference frame (e.g., a terrestrial based transmitter at a fixed location on the earth). Here, a reference pseudorange rate may comprise a pseudorange rate from the receiving device to the transmitter, which would be zero. Thus, if such a receiving device is actually moving relative to the reference frame (i.e., not static as previously assumed), a measured pseudorange rate from the receiving device to the static transmitter may be measurably non-zero. It should be understood, however, that these are merely examples of how reference pseudorange rates may be determined according to particular implementations, and that claimed subject matter is not limited in this respect.

By using a measured pseudorange rate from carrier phase obtained directly from a received SPS signal to detect transitions between a receiver being in motion and the receiver being relatively still, a more timely transition between application of a dynamic filter model and application of a static filter model may be achieved, thereby reducing the aforementioned incidence of position drift. Using such a measured pseudorange rate determined from a change in carrier phase measured directly from a received SPS signal to detect such transitions may also mitigate the effects of multipath leading to erroneous detections of transitions between a receiver being in motion and the receiver being relatively still.

Reference is now made to FIG. 1, which is a schematic block diagram illustrating an exemplary signaling environment 100 that includes at least one device 102 capable of supporting, at least in part, one or more position/velocity/time estimation processes based, at least in part, on one or more transmitted and received SPS signals, in accordance with an example implementation.

Environment 100 may include various computing and communication resources capable of providing at least some form of a position/velocity/time estimation process with regard to device 102 based, at least in part, on one or more SPS signals 112 from transmitters of an SPS 106. Device 102 is representative, therefore, of an electronic device that is capable of performing with or without assistance a position/velocity/time estimation process based at least in part on SPS signals. Accordingly, device 102 may include an SPS receiver 104. Thus, for example, device 102 may take the form of a stand-alone navigation circuit or device in certain implementations. In other implementations, as illustrated in the example shown in FIG. 1, device 102 may include other circuitry 105 and/or the like which enables device 102 to perform and/or support other processes. By way of example but not limitation, device 102 may take the form of a mobile or portable computing device or machine that may also be capable of communicating with one or more resources within a wireless/wired communication network 116 over one or more wireless communication links 150 coupled to a base station 114 or other like access point. Thus, for example, device 102 may include a mobile station such as a cellular phone, a smart phone, a personal digital assistant, a portable computing device, a navigation unit, and/or the like or any combination thereof. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

As illustrated in the example in FIG. 1, SPS 106 may, for example, include one or more GNSS 108, each of which may include a different plurality of SVs 110 that may transmit different SPS signals 112. As illustrated, SPS 106 may, for example, include one or more terrestrial transmitters 111 and/or other like transmitting devices that may transmit certain SPS signals 112.

Techniques described herein may be used with an "SPS" that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters 111 may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

With this in mind and in accordance with certain aspects, some exemplary methods and apparatuses will now be described, which may be implemented in whole or part in one or more devices, such as device 102, to support, at least in part, one or more position/velocity/time estimation processes based, at least in part, on one or more transmitted and received SPS signals. By way of example, one or more devices 102 may include dedicated and/or special-purpose programmed circuitry capable of supporting a position/velocity/time estimation process.

Figure 2:
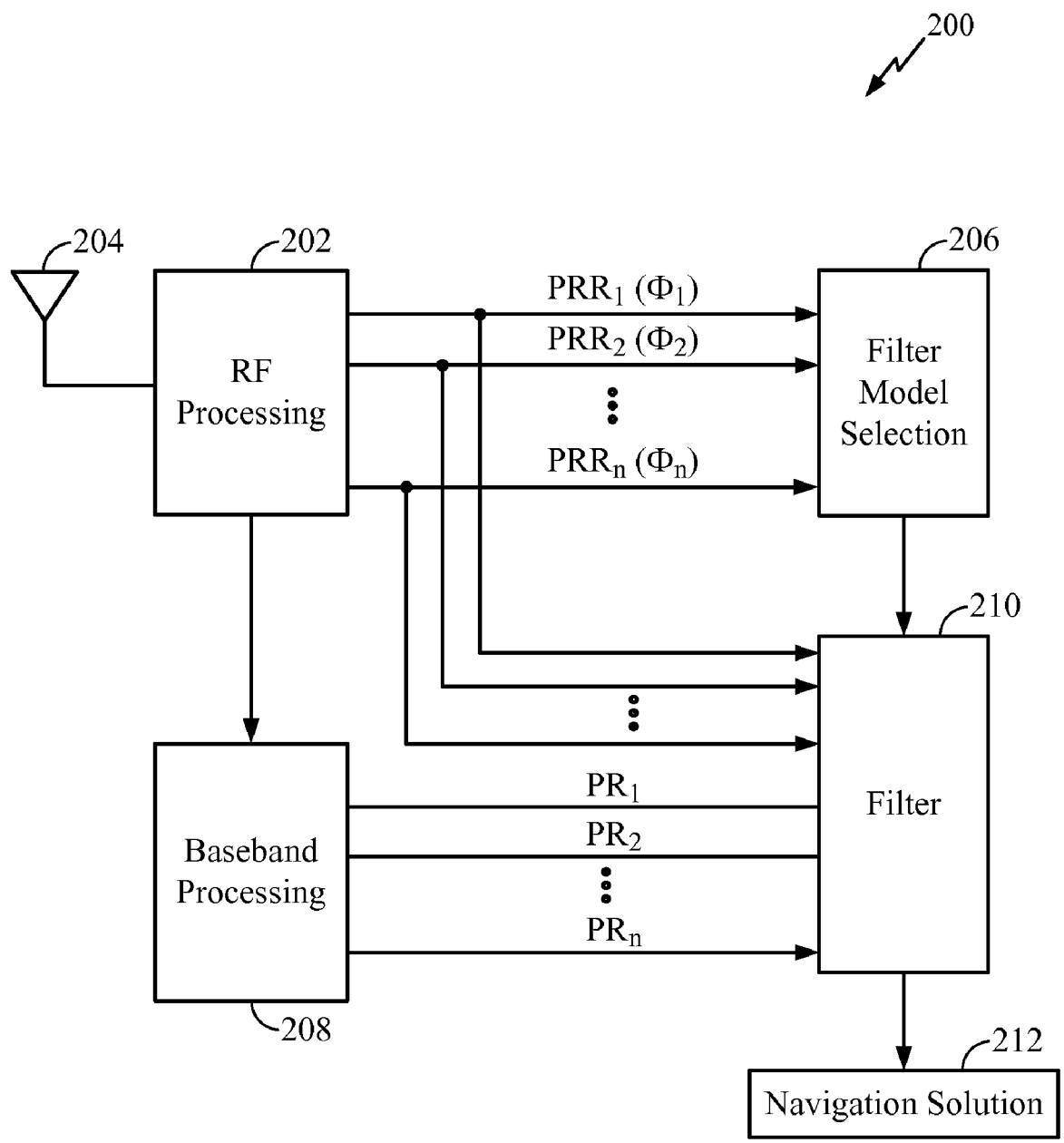
FIG. 2 is a schematic block diagram of a receiver for processing SPS signals to provide a navigation solution according to a particular implementation.

FIG. 2 is a schematic diagram of a receiver 200 adapted to process signals for use in obtaining a navigation solution including an estimate of a location and/or position fix for receiver 200. Here, SPS signals received from multiple transmitters (not shown) at antenna 204 are processed to obtain measurements of pseudorange and pseudorange rate to the transmitters for use in determining a navigation solution.

Radio frequency (RF) processing 202 comprises circuitry and logic to process and/or condition received signals for use in obtaining measurements of pseudorange and pseudorange rate. For example, RF processing 202 may perform analog filtering, downconverting and/or analog to digital conversion of received SPS signals, just to name a few examples. RF processing may also perform detection and tracking of characteristics of SPS signals received at antenna 204 such as carrier phase and frequency using known techniques. In a particular implementation, RF processing 202 detects and/or measures carrier phase $\Phi_i$ associated with received SPS signals i=1, 2, . . . n using techniques known to those of ordinary skill in the art. In another particular implementation, RF processing 202 may compute measurements of psuedorange rates $PRR_i$ associated with received SPS signals SPS signals i=1, 2, . . . n based, at least in part, on associated carrier phase measurements $\Phi_i$. For example, RF processing 202 may compute such a pseudorange rate as follows:

$PRR_i(\Phi_i) = \Delta\Phi_i/\Delta t$, where:

$\Delta\Phi_i$ is a change in measured carrier phase of SPS signal i; and $\Delta t$ is a period over which a change in carrier phase is measured (e.g., 1.0 second). It should be understood, however, that these are merely examples of how a pseudorange rate may be measured based, at least in part, on a detected and/or measured change in carrier phase, and claimed subject matter is not limited in this respect.

In particular implementations, RF processing 202 maintains a local receiver clock that is synchronized to a system clock established for an SPS and/or GNSS. Such a local receiver clock may be used for processing SPS signals received at antenna 204 as discussed above. For example, such a local receiver clock may be used for obtaining carrier phase measurements $\Phi_1, \Phi_2, \ldots \Phi_n$. It should be understood that a local receiver clock may, from time to time, drift or become biased so as to be unsynchronized with a system clock established for an SPS and/or GNSS. Accordingly, such a bias in a local receiver clock may result in errors associated with carrier phase measurements $\Phi_1, \Phi_2, \ldots \Phi_n$ obtained at RF processing 202.

In particular implementations, RF processing 202 may compute $PRR_i(\Phi_i)$ using a single difference between measurements of $\Phi_i$ taken in different periods. Accordingly, this particular computation of $\Delta\Phi_i$ may remove at least a portion of error associated with measurements of $\Phi_i$ arising from a bias error associated with a local receiver clock. As such, measurement $PRR_i(\Phi_i)$ may also be determined with a reduction in such clock error.

In particular implementations, at baseband processing 208 downconverted SPS signals may be processed to provide codephase detections for acquired SPS signals. Baseband processing 208 may then apply additional logic to resolve ambiguities of codephase detections to provide pseudorange measurements PR, associated with SPS signals i=1 to n.

As discussed above, filter 210 may apply a particular filtering model from among multiple available filtering models (e.g., a static or dynamic filter) to pseudorange and pseudorange rate measurements for providing an estimated position, time and/or velocity as part of a navigation solution 212. For example, filter 210 may apply one or more variations of a Kalman filter to pseudorange measurements $PR_i$ and/or pseudorange rate measurements $PRR_i(\Phi_i)$. As discussed above according to a particular implementation, filter 210 may apply a different one of multiple available filter models, such as a dynamic filter model, a static filter model, indoor filter model, outdoor filter model, urban filter model and/or rural filter model, etc. depending on different conditions.

In a particular implementation, filter model selection 206 may select a particular filter model applied by filter 210 based, at least in part, on a measured pseudorange rate $PRR_i$ ($\Phi_i$) associated with received SPS signals i=1, 2, . . . n. In a particular example, filter model selection 206 receives from RF processing 202 pseudorange rate measurements $PRR_i$ ($\Phi_i$), which is determined as function of carrier phase $\Phi_i$ as discussed above. Thus, filter model selection may initiate transitions between and/or among application of multiple available filtering models based, at least in part, on carrier phase $\Phi_i$ (e.g., using $PRR_i(\Phi_i)$ computed based on $\Phi_i$) obtained directly from RF processing 202. While particular implementations discussed herein are directed to obtaining a measured pseudorange rate from carrier phase, other techniques may be used (e.g., energy/Doppler detections) to obtain pseudorange rate measurements without deviating from claimed subject matter.

Filter model selection 206 may, on a periodic basis, determine whether a receiver has transitioned from being relatively still to being in motion, or whether such a receiver has transitioned from being in motion to being relatively still. In any particular time interval (e.g., a 1.0 second epoch), filter model selection 206 may initiate a transition between application of a dynamic filter mode and application of a static filter model based, at least in part, on measurements of pseudorange rate $PRR_1(\Phi_1), PRR_2(\Phi_2), \ldots PRR_n(\Phi_n)$ computed from carrier phase $\Phi_1, \Phi_2, \ldots \Phi_n$. as described above.

In one particular implementation, filter model selection 206 may use $PRR_1(\Phi_1), PRR_2(\Phi_2), \ldots PRR_n(\Phi_n)$ to determine that a receiver has, for example, transitioned from being relatively still to being in motion and initiate a change from application of a static filtering model to a dynamic filtering model. In a particular example, a transmitter of an SPS signal may be assumed (or known) to be static (e.g., a terrestrial based transmitter). If a receiver is assumed to be at rest or static, a reference pseudorange rate to the static transmitter may be assumed to be approximately zero and a currently applied filter model may be static. Here, if filter model selection 206 subsequently determines that the pseudorange rate is actually measured to be significantly non-zero (e.g., |$PRR_i$ ($\Phi_i$)|>10.0 cm/sec), filter model selection 206 may determine that the receiver is now in motion. As such, filter model selection 206 may then initiate filter 210 to commence application of a dynamic filtering model. Likewise, if a current filter model is dynamic (applied by filter 210 under the assumption that the receiver is in motion) and filter selection model 206 determines that the pseudorange rate to the static transmitter is actually measured to be approximately zero (e.g., |$PRR_i(\Phi_i)$|<5.0 cm/sec), filter model selection 206 may determine that the receiver's motion has come to rest. As such, filter model selection 206 may then initiate filter 210 to commence application of a static filtering model. It should be understood, however, that these are merely examples of how measured changes in carrier phase may be used to initiate transitions in application of particular available filter models, and claimed subject matter is not limited in this respect.

As indicated above, RF processing 202 may receive and process SPS signals from multiple SVs. As such, filter model selection 206 may select a particular SPS signal i from which to determine whether a static or dynamic filter model is to be applied. For example, filter model selection 206 may select an SPS signal i likely to provide reliable carrier phase measurements $\Phi_i$ having a smallest associated expected error. For example, such an SPS signal i may have the strongest signal and/or highest associated signal to noise ratio among multiple received SPS signals. It should be understood, however, that this is merely one example of how an SPS signal may be selected for determining how a filtering model may be applied according particular implementations, and claimed subject matter is not limited in this respect.

In other implementations, filter model selection 206 may use measured and reference pseudorange rates to a receiving device from two or more SPS signals. For example, a probability model may be applied to multiple measured pseudorange rates PRR_$m_i$ obtained from multiple different SPS signals i. Here, corresponding reference pseudorange rates PRR_$p_i$ may be determined as predicted pseudorange rates under an assumption that the receiving device is static relative to a frame of reference. As such, PRR_$p_i$ may be determined based upon known or predicted trajectories of corresponding transmitters i relative to the frame of reference (e.g., orbital characteristics of SVs in an SPS) and an approximate location of the receiving device. Then, differences $\Delta PRR_i$=PRR_$m_i$−PRR_$p_i$ may be determined for SPS signals i=1, . . . , n. Here, a probability $P_D$ that a receiver is in a dynamic state (e.g., in motion or not still) may be determined based upon $\Delta PRR_R$ for SPS signals i=1, . . . , n.

In one example, a "primary" SPS signal R may be chosen from among SPS signals i=1, . . . , n as providing a particularly accurate and/or reliable measured pseudorange rate. Here, a "primary" difference $\Delta PRR_R$=PRR_$m_R$−PRR_$p_R$ may be compared with differences $\Delta PRR_i$ for i≠R in the following probability model:

$$P_D = P[D|\Delta PRR_1 - \Delta PRR_R, \Delta PRR_2 - \Delta PRR_R, \ldots, \Delta PRR_{R-1} - \Delta PRR_R, \Delta PRR_{R+1} - \Delta PRR_R, \ldots, \Delta PRR_n - \Delta PRR_R].$$

In an example, primary SPS signal R may be selected from among received SPS signals i=1, . . . , n as a signal likely to provide a particularly accurate and/or reliable pseudorange rate measurement, such as an acquired SPS signal having the highest signal strength and/or associated signal to noise ratio, for example. Of course this is merely one example of how a primary SPS signal may be selected from among multiple received SPS signals to provide a primary difference $\Delta PRR_R$, and claimed subject matter is not limited in this respect.

In a particular implementation where P[D|$\Delta PRR_1$−$\Delta PRR_R$], . . . , P[D|$\Delta PRR_{R-1}$−$\Delta PRR_R$], P[D|$\Delta PRR_{R+1}$−$\Delta PRR_R$], . . . , P[D|$\Delta PRR_n$−$\Delta PRR_R$] are assumed to be substantially independent, $P_D$ may be reduced as follows:

$$P_D \approx P[D|\Delta PRR_1 - \Delta PRR_R] \times P[D|\Delta PRR_{R-1} - \Delta PRR_R] \times P[D|\Delta PRR_{R+1} - \Delta PRR_R] \times \ldots \times P[D|\Delta PRR_n - \Delta PRR_R].$$

In a particular implementation, probabilities for P[D|$\Delta PRR_i$−$\Delta PRR_R$] may be chosen for set values of as 0.9 for $\Delta PRR_R$−$\Delta PRR_R$>0.05 and 0.1 for $\Delta PRR_i$−$\Delta PRR_R$<0.05. Of course, this is merely a particular numerical illustration and claimed subject matter is not limited to this or any other particular numerical implementation.

Here, $P_D$ may then be compared with a threshold to determine whether a receiver is in a dynamic or static state, and consequently whether filter 210 is to apply a static or dynamic filter model. For example, a receiver may be determined to be in a dynamic state if $P_D > T_{D1}$, and determined to be in a static state if $P_D < T_{D2}$. While the above example is directed to determining whether to transition application of a filtering model based on $P_D$, other implementations may determine whether to transition based on a probability that a receiver is in a static state, which may be similarly determined from an application of probability models to differences $\Delta PRR_i$−$\Delta PRR_R$, for i≠R.

Also, application of probability models to differences $\Delta PRR_i$−$\Delta PRR_R$, for i≠R, in the particular example shown above is directed to selecting between application of two different filter models. In other implementations, probability models may be similarly applied to differences $\Delta PRR_R$−$\Delta PRR_R$, for i≠R, for determining whether to transition among three or more such filter models as pointed out above.

As pointed out above, receiver clock frequency error may affect detections of carrier phase $\Phi_1$, $\Phi_2$, . . . $\Phi_n$ at RF processing 202. Also as pointed out above, measured pseudorange rates PRR$_1$($\Phi_1$), PRR$_2$($\Phi_2$), . . . PRR$_n$($\Phi_n$) may be determined from measured changes in $\Phi_1$, $\Phi_2$ . . . $\Phi_n$ obtained at the same epoch and/or processing cycle. Accordingly, errors in such measurements resulting from clock frequency bias errors may be highly correlated. As such, to the extent that any receiver clock frequency error remains in measured PRR$_1$($\Phi_1$), PRR$_2$($\Phi_2$), . . . PRR$_n$($\Phi_n$), computation of $P_D$ as expressed above, based upon differences between $\Delta PRR_i$ and $\Delta PRR_R$ for i=1, . . . R−1, R+1, . . . n, such clock error may be removed by such differences.

Figure 3:
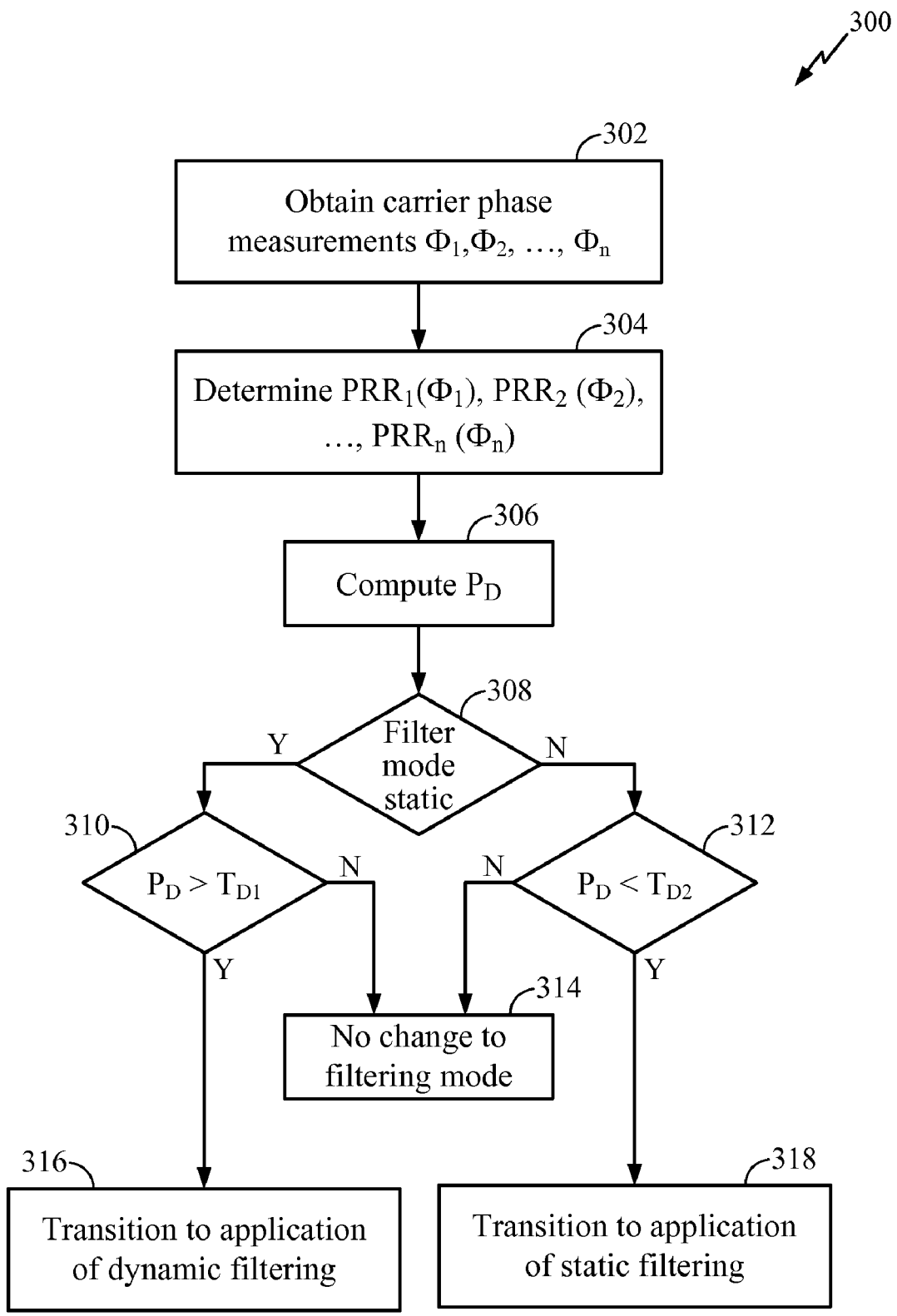
FIG. 3 is a flow diagram illustrating process for transitioning application of a filtering model in response to measured changes in a carrier phase according to a particular implementation.

FIG. 3 is a flow diagram of a process of transitioning between and/or among applications of multiple available filtering models according to a particular implementation. At block 302, carrier phase measurements $\Phi_1$, $\Phi_2$, . . . $\Phi_n$ obtained (e.g., by RF processing 202). Following carrier phase measurements obtained in different periods, pseudorange rate measurements PRR$_1$($\Phi_1$), PRR$_2$($\Phi_2$) . . . PRR$_n$($\Phi_n$) are determined at block 304 based, at least in part, on carrier phase measurements $\Phi_1$, $\Phi_2$, . . . $\Phi_n$. using techniques described above, for example.

At block 306, a probability $P_D$ that a receiver is in a dynamic state (e.g., in motion) may be computed based, at least in part, on PRR$_1$($\Phi_1$), PRR$_2$($\Phi_2$) . . . PRR$_n$($\Phi_n$) as discussed above, for example. For example, $P_D$ may be determined based upon $\Delta PRR_i$−$\Delta PRR_R$, for i≠R, as discussed above. If a filter is currently applying a static filter model (e.g., in a "static mode"), diamond 310 determines whether the current filtering model should be transitioned to application of a dynamic filtering model at block 316 based, at least in part, on application of $P_D$ to threshold $T_{D1}$ at as discussed above. Similarly, if a filter is currently applying a dynamic filter model (e.g., in a "dynamic mode"), diamond 312 determines whether the current filtering model should be transitioned to application of a static filtering model at block 318 based, at least in part, on application of $P_D$ to threshold $T_{D2}$. Here, depending on particular implementations, thresholds $T_{D1}$ and $T_{D2}$ may be equal or different. Also, it should be understood that the process of FIG. 3 may be modified for determining whether to transition among application of three or more filter models.

Particular implementations described herein relate to transition between application of different filter models in response to detection of particular conditions. In other implementations, a filter model may be merely selected for application to pseudorange measurements without a transition between distinct filter models.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   obtaining one or more pseudorange measurements based, at least in part, on one or more received satellite positioning system (SPS) signals acquired at a receiver of a mobile device;
   selecting one of a plurality of filter models for application to said pseudorange measurements to obtain a navigation solution for said mobile device based, at least in part, on a likelihood that said mobile device is in a motion state computed based, at least in part, on a difference between a measured pseudorange rate and a reference pseudorange rate associated with at least one of said received SPS signals;
   processing a plurality of said SPS signals to determine pseudorange rate measurements associated with said plurality of SPS signals, and wherein said likelihood is computed based, at least in part on differences between said pseudorange rate measurements and associated reference pseudorange rates;
   selecting a primary SPS signal from among said plurality of SPS signals; and
   determining a primary difference comprising a difference between measured and reference pseudorange rates associated with said primary SPS signal, wherein said likelihood is computed based, at least in part, on differences between said primary difference and said differences between said pseudorange rate measurements and associated reference pseudorange rates for SPS signals other than said primary SPS signal.

2. The method of claim 1, and further comprising:
   processing said at least one of said SPS signals to determine a measured change in a carrier phase of said at least one of said SPS signals; and
   computing said measured pseudorange rate based, at least in part on said measured change in said carrier phase.

3. The method of claim 1, and further comprising selecting said at least one of said SPS signals based, at least in part, on signal strength associated with individual ones of said one or more SPS signals.

4. The method of claim 1, wherein at least one of said models comprises a static filter model and at least one of said models comprises a dynamic filter model.

5. The method of claim 1, and further comprising selecting said primary SPS signal based, at least in part, on signal strengths and/or signal to noise ratios associated with said SPS signals.

6. The method of claim 1, wherein said selecting said filter model further comprises applying of one or more thresholds to a probability model based, at least in part, on said difference between said measured pseudorange rate and said reference pseudorange rate.

7. An apparatus comprising:
   a receiver to receive and process satellite positioning system (SPS) signals; and one or more baseband processors to obtain pseudorange measurements based, at least in part, on said received SPS signals; and one or more processors programmed with instructions to:
select one of a plurality of filter models for application to said pseudorange measurements to obtain a navigation solution based, at least in part, on a likelihood that said apparatus is in a motion state computed based, at least in part, on a difference between a measured pseudorange rate and a reference pseudorange rate associated with at least one of said received SPS signals;
determine pseudorange rate measurements associated with a plurality of said received and processed SPS signals;
select said filter model for application to said pseudorange measurements based, at least in part, on differences between said pseudorange rate measurements and associated reference pseudorange rates;
select a primary SPS signal from among said plurality of SPS signals; and
determine a primary difference comprising a difference between measured and reference pseudorange rates associated with said primary SPS signal, wherein said likelihood is further computed based, at least in part, on differences between said primary difference and said differences between said pseudorange rate measurements and associated reference pseudorange rates for SPS signals other than said primary SPS signal.

8. The apparatus of claim 7, wherein said receiver is further adapted to process said at least one of said SPS signals to determine a measured change in a carrier phase of said at least one of said SPS signals; and wherein said one or more processors are further programmed with instructions to compute said measured pseudorange rate based, at least in part on said measured change in said carrier phase.

9. The apparatus of claim 7, wherein said one or more processors are further programmed with instructions to select said at least one of said SPS signals based, at least in part, on signal strength associated with individual ones of said at least one of said SPS signals.

10. The apparatus of claim 7, wherein at least one of said models comprises a static filter model and at least one of said models comprises a dynamic filter model.

11. The apparatus of claim 7, wherein said one or more processors are further programmed with instructions to select said primary SPS signal based, at least in part, on signal strengths and/or signal to noise ratios associated with said SPS signals.

12. The apparatus of claim 7, wherein said one or more processors are further programmed with instructions to select said filter model for application to said pseudorange measurements by application of one or more thresholds to a probability model based, at least in part, on said difference between said measured pseudorange rate and said reference pseudorange rate.

13. An article comprising:
a non-transitory storage medium comprising machine-readable instructions which are executable by a processor to:
select one of a plurality of filter models for application to pseudorange measurements obtained from processing of one or more satellite positioning system (SPS) signals at a receiver to obtain a navigation solution based, at least in part, on a likelihood that said receiver is in a motion state computed based, at least in part, on a difference between a measured pseudorange rate and a reference pseudorange rate associated with at least one processed SPS signal;
determine pseudorange rate measurements associated with said one or more SPS signals;
select said filter model for application to said pseudorange measurements based, at least in part, on differences between said pseudorange rate measurements and associated reference pseudorange rate;
select a primary SPS signal from among said one or more SPS signals; determine a primary difference comprising a difference between measured and reference pseudorange rates associated with said primary SPS signal; and
compute said likelihood based, at least in part, on differences between said primary difference and said differences between said pseudorange rate measurements and associated reference pseudorange rates for SPS signals other than said primary SPS signal.

14. The article of claim 13, wherein said measured pseudorange rate is determined based, at least in part, on a measured change in a carrier phase of said at least one processed SPS signal.

15. The article of claim 13, wherein said instructions are further executable by said processor to select said at least one processed SPS signal from among said one or more SPS signals based, at least in part, on signal strengths associated with individual ones of said SPS signals.

16. The article of claim 13, wherein at least one of said models comprises a static filter model and at least one of said models comprises a dynamic filter model.

17. The article of claim 13, wherein said instructions are further executable by said processor to select said primary SPS signal based, at least in part, on signal strengths and/or signal to noise ratios associated with said SPS signals.

18. The article of claim 13, wherein said instructions are further executable by said processor to select said filter model for application to said pseudorange measurements by application of one or more thresholds to a probability model based, at least in part, on said difference between said measured pseudorange rate and said reference pseudorange rate.

19. An apparatus comprising:
means for obtaining one or more pseudorange measurements based, at least in part, on one or more received satellite positioning system (SPS) signals;
means for selecting one of a plurality of filter models for application to said pseudorange measurements to obtain a navigation solution based, at least in part, on a likelihood that said apparatus is in a motion state computed based, at least in part, on a difference between a measured pseudorange rate and a reference pseudorange rate associated with at least one of said received SPS signals;
means for processing said one or more SPS signals to determine pseudorange rate measurements associated with said one or more SPS signals, and wherein said means for selecting further comprises means for computing said likelihood based, at least in part, on differences between said pseudorange rate measurements and associated reference pseudorange rates;
means for selecting a primary SPS signal from among said one or more SPS signals; and
means for determining a primary difference comprising a difference between measured and reference pseudorange rates associated with said primary SPS signal, wherein said likelihood is further computed based, at least in part, on differences between said primary difference and said differences between said pseudorange rate measurements and associated reference pseudorange rates for SPS signals other than said primary SPS signal.

20. The apparatus of claim 19, and further comprising:

means for processing said at least one of said SPS signals to determine a measured change in a carrier phase of said at least one of said SPS signals; and means for computing said measured pseudorange rate based, at least in part on said measured change in said carrier phase.

21. The apparatus of claim 19, and further comprising means for selecting said at least one of said SPS signals based, at least in part, on signal strength associated with individual ones of said one or more SPS signals.

22. The apparatus of claim 19, wherein at least one of said models comprises a static filter model and at least one of said models comprises a dynamic filter model.

23. The apparatus of claim 19, and further comprising means for selecting said primary SPS signal based, at least in part, on signal strengths and/or signal to noise ratios associated with said one or more SPS signals.

24. The apparatus of claim 19, wherein said means for selecting said filter model for application to said pseudorange measurements further comprises selecting said filter model based, at least in part, on application of one or more thresholds to a probability model based, at least in part, on said difference between said measured pseudorange rate and said reference pseudorange rate.

* * * * *